United States Patent
Pignataro et al.

(10) Patent No.: US 10,588,012 B2
(45) Date of Patent: Mar. 10, 2020

(54) IN-SITU OPERATIONS, ADMINISTRATION AND MANAGEMENT PROXY

(71) Applicant: Cisco Technology, Inc., San Jose, CA (US)

(72) Inventors: Carlos M. Pignataro, Cary, NC (US); Nagendra Kumar Nainar, Morrisville, NC (US); Rajiv Asati, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 202 days.

(21) Appl. No.: 15/662,555

(22) Filed: Jul. 28, 2017

(65) Prior Publication Data

US 2019/0037391 A1    Jan. 31, 2019

(51) Int. Cl.
| | |
|---|---|
| H04L 12/00 | (2006.01) |
| H04W 8/26 | (2009.01) |
| H04L 12/46 | (2006.01) |
| H04L 29/06 | (2006.01) |
| H04L 12/24 | (2006.01) |
| H04W 80/04 | (2009.01) |

(52) U.S. Cl.
CPC ............ *H04W 8/26* (2013.01); *H04L 12/467* (2013.01); *H04L 41/00* (2013.01); *H04L 63/20* (2013.01); *H04L 12/4641* (2013.01); *H04W 80/04* (2013.01)

(58) Field of Classification Search
CPC ........ H04W 8/26; H04W 80/04; H04L 63/20; H04L 12/467; H04L 1/0061; H04L 29/12066; H04L 45/22; H04L 41/5038; H04L 43/10; H04L 41/08; H04L 43/08; H04L 41/0631
USPC .................................................. 709/232, 245
See application file for complete search history.

(56) References Cited

U.S. PATENT DOCUMENTS

| | | | |
|---|---|---|---|
| 6,507,875 B1 * | 1/2003 | Mellen-Garnett | G06F 9/466 718/101 |
| 6,889,259 B2 * | 5/2005 | Kapoor | H04L 29/12066 709/245 |
| 7,177,325 B2 * | 2/2007 | Claseman | H04L 1/0061 370/469 |
| 7,808,919 B2 | 10/2010 | Nadeau et al. | |
| 8,195,401 B2 * | 6/2012 | Ella | G06Q 10/06 702/13 |
| 8,564,770 B1 * | 10/2013 | Lewis | G01N 21/31 356/303 |
| 9,438,486 B2 | 9/2016 | Shaw et al. | |
| 10,374,876 B2 * | 8/2019 | Willis | H04L 41/0806 |
| 2007/0005801 A1 * | 1/2007 | Kumar | H04L 63/08 709/238 |

(Continued)

*Primary Examiner* — Frantz Coby
(74) *Attorney, Agent, or Firm* — Edell, Shapiro & Finnan, LLC

(57) ABSTRACT

A process executing on a network connected device provides distinct Internet Protocol addresses to a plurality of workload applications. The process determines that a first of the plurality of workload applications will not be providing in-situ Operations, Administration and Management (iOAM) data in packets processed by the first of the plurality of workload applications. The process receives a packet processed by the first of the plurality of workload applications. The process inserts iOAM data for the first of the plurality of workload applications into the packet.

20 Claims, 9 Drawing Sheets

(56) References Cited

U.S. PATENT DOCUMENTS

| | | | |
|---|---|---|---|
| 2008/0052757 A1* | 2/2008 | Gulati | H04L 41/0809 726/1 |
| 2010/0150139 A1* | 6/2010 | Lawson | H04L 12/66 370/352 |
| 2010/0150160 A1* | 6/2010 | Kinsky | H04L 12/46 370/395.53 |
| 2014/0201374 A1 | 7/2014 | Ashwood-Smith et al. | |
| 2015/0092564 A1* | 4/2015 | Aldrin | H04L 41/5038 370/241.1 |
| 2016/0048403 A1 | 2/2016 | Bugenhagen | |
| 2016/0112328 A1 | 4/2016 | Arland | |
| 2016/0315819 A1 | 10/2016 | Dara et al. | |
| 2016/0315850 A1 | 10/2016 | Dara et al. | |
| 2016/0315921 A1 | 10/2016 | Dara et al. | |
| 2017/0111209 A1* | 4/2017 | Ward | H04L 41/0631 |
| 2018/0278548 A1* | 9/2018 | Pignataro | H04L 43/08 |
| 2018/0309689 A1* | 10/2018 | Nainar | H04L 47/283 |
| 2018/0331890 A1* | 11/2018 | Song | H04L 41/08 |
| 2018/0331933 A1* | 11/2018 | Song | H04L 43/10 |
| 2018/0359176 A1* | 12/2018 | Nainar | H04L 45/22 |
| 2019/0037391 A1* | 1/2019 | Pignataro | H04W 8/26 |

\* cited by examiner

700

```
ADDR = {2001:DB8::1; 2001:DB8::100; 2001:DB8::200} if { (ingress_port == vport13) && (dest_addr == $ADDR || ipv6_nextprotocol == srh) } {
    push ioam(ptr->ptr1);
    forward;
}
elseIf {ingress_port == vport123} {
    forward;
}
```

FIG.7

IN-SITU OPERATIONS, ADMINISTRATION AND MANAGEMENT PROXY

TECHNICAL FIELD

The present disclosure relates to providing in-situ Operations, Administration and Management data to data packets.

BACKGROUND

Container applications are a type of computer application that leverages a form of virtualization. Unlike virtual machines, in which both a guest operating system kernel and the user space are virtualized on a per-virtual machine basis, container applications utilize separate user spaces with a shared host operating system kernel space. Because multiple container applications may execute on a single network connected device, certain applications provide individual networking and addressing to the individual container applications executing on the same physical device.

As used herein "in-situ Operations, Administration, and Maintenance" or iOAM refers to the concept of directly encoding telemetry information within a data packet as the packet traverses a network or telemetry domain. Mechanisms which add tracing or other types of telemetry information to the regular data traffic, sometimes also referred to as "in-band" OAM can complement active, probe-based mechanisms such as ping or traceroute, which are sometimes considered as "out-of-band", because the messages are transported independently from regular data traffic.

BRIEF DESCRIPTION OF THE DRAWINGS

FIG. 7 is an illustration of pseudocode operable to provide iOAM proxy services, according to an example embodiment.

DESCRIPTION OF EXAMPLE EMBODIMENTS

Overview

In one embodiment, a process executing on a network connected device provides distinct Internet Protocol addresses to a plurality of workload applications. The process determines that a first of the plurality of workload applications will not be providing iOAM data in packets processed by the first of the plurality of workload applications. The process receives a packet processed by the first of the plurality of workload applications. The process inserts iOAM data for the first of the plurality of workload applications into the packet.

Example Embodiments

Figure 1:
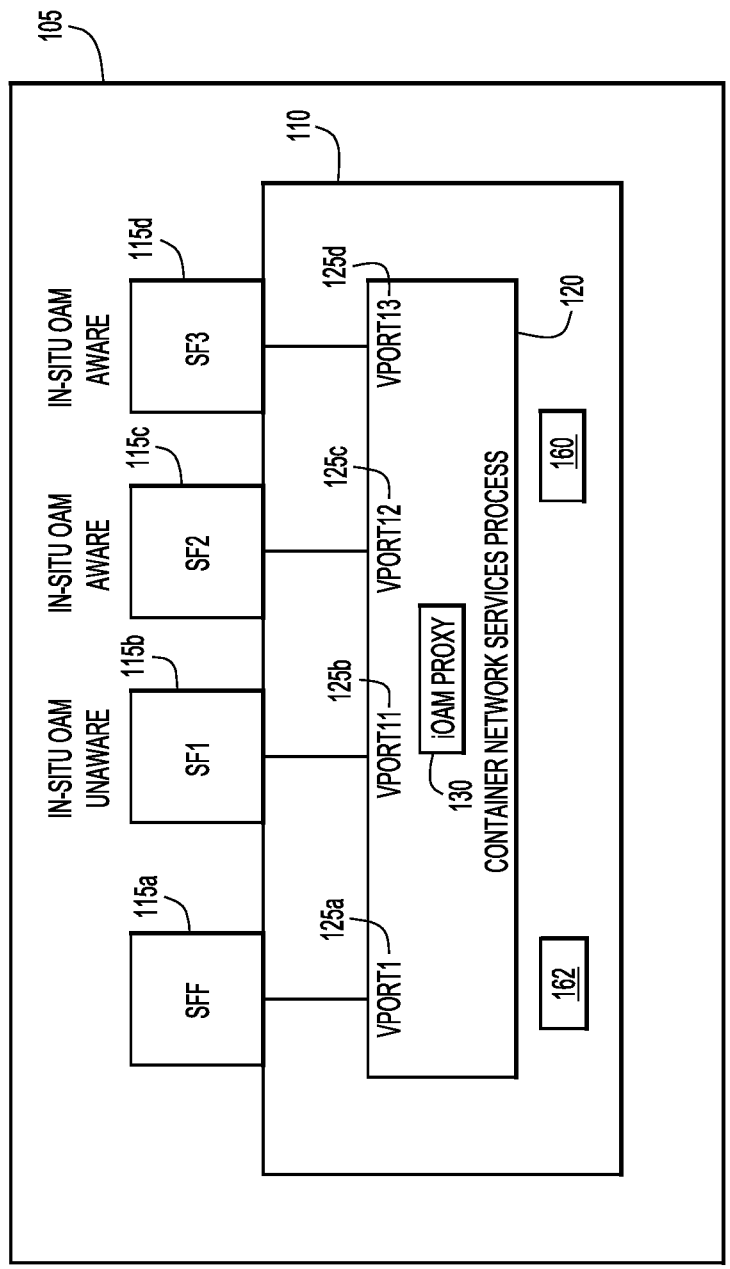
FIG. 1 is a functional block diagram of a first network connected device configured to provide an iOAM proxy, according to an example embodiment.

With reference now made to FIG. 1, depicted therein is a network connected device 105 that is configured to provide in-situ Operations, Administration and Management (iOAM) functions for workload applications. As used herein, "workload applications" refers to the class of applications that includes virtual machines, container applications and microservices applications. The current example embodiment implements an iOAM proxy in a container application environment, though the techniques are similarly applicable to other workload application environments, including virtual machine application environments and microservices application environments. As illustrated in FIG. 1, executing in network connected device 105 are a number of processes. These processes include a first process that provides a virtualization environment, in this case a container host application 110, such as the Linux Docker application. Executing within container host application 110 are a plurality of container applications 115a-d (also referred to herein as containers 115a-d), and a container network services process 120 that provides policy based networking to container applications 115a-d. For example, process 120 may provide individual virtual ports 125a-d for each of container applications 115a-c, each associated with a distinct Internet Protocol (IP) address. Process 120 may also be viewed as a virtual Open System Interconnection Model Layer 2 bridge. Process 120 may be embodied as, for example, Project Contiv's Contiv hostagent process. Accordingly, process 120 may execute as a plug-in to container host application 110.

Absent an iOAM proxy as described herein, container applications 115a-d are the functional elements of network connected device 105 that are responsible for inserting iOAM data specific to respective container applications 115a-d into data packets processed by container applications 115a-d. For example, container applications 115a-d, if they are iOAM aware, will insert iOAM data into the packets as they process them. This data may include, for example, a timestamp of when a packet is processed, an addressed associated with the container application, a type of service applied by the container application and/or other types of data known to those skilled in the art. Absent an iOAM proxy, the insertion of iOAM data into a packet is dependent on the container—if a particular container is not configured to provide iOAM then iOAM data is not inserted into the packets. Similarly, absent an iOAM proxy, a network connected device may not be able to provide alternative deployment modes to accommodate iOAM in, for example, situations in which a particular container application experiences high utilization that renders iOAM performed by the particular container application difficult or impossible based upon service level demands.

Network connected device 105, on the other hand, is configured with iOAM proxy 130. As will be described in detail below, iOAM proxy 130 is configured to provide iOAM functionality in place of container applications 115a-d. The iOAM functionality provided by iOAM proxy 130 may be provided for container applications that are not configured to provide iOAM functionality on their own or for container applications that are configured to provide iOAM functionality, but which off-load the iOAM functionality to achieve optimization or other benefits.

As illustrated in FIG. 1, iOAM proxy 130 is included as a plug-in to process 120. According to other example embodiments, iOAM proxy 130 may be included as functionality provided by container host application 110 or as a separate plug-in executing within container host application 110 separate from process 120. In carrying out iOAM proxy operations, iOAM proxy 130 may access data stored in flow table 160 and iOAM proxy database 162. The content and function of these data stores will be described in greater detail below.

Figure 2:
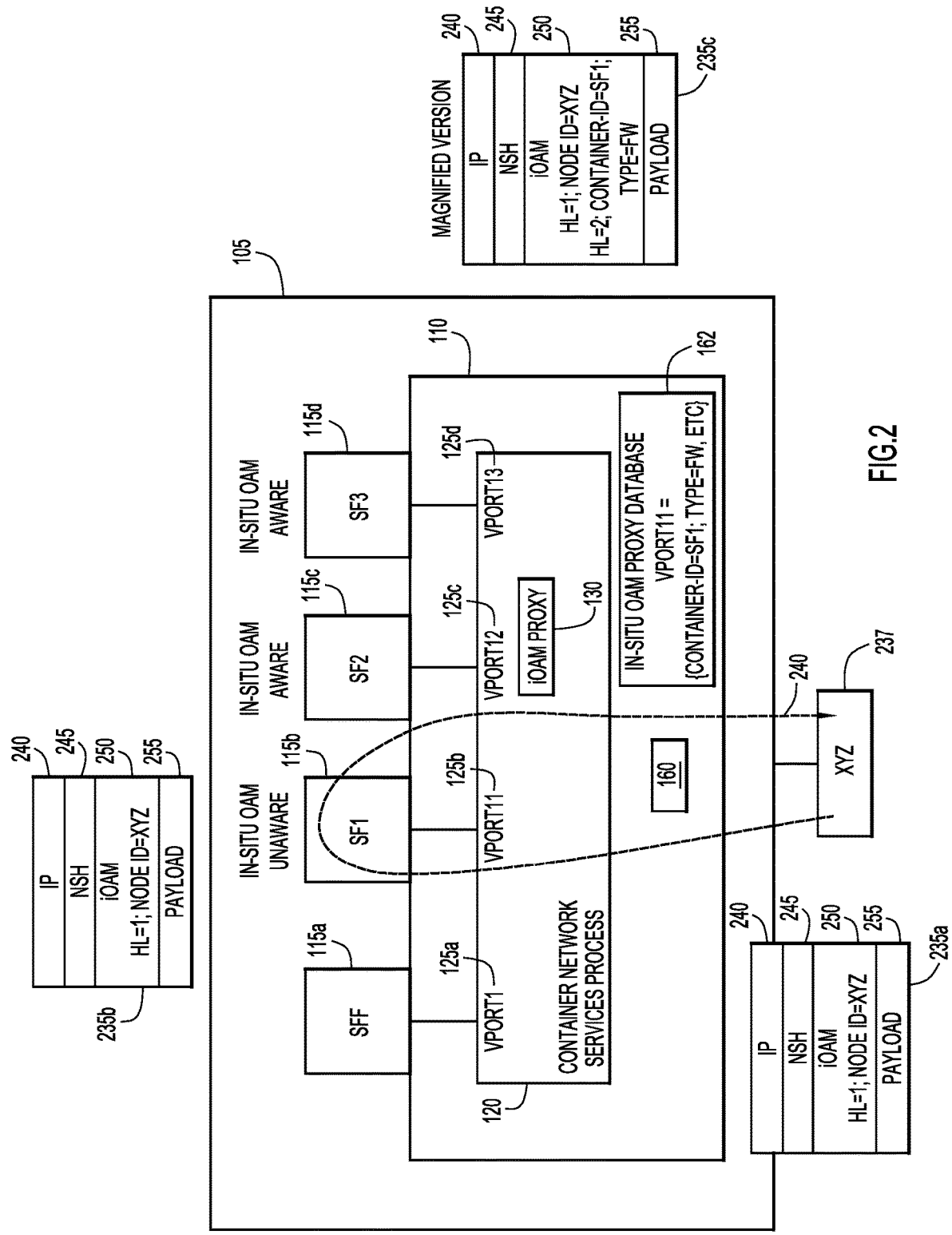
FIG. 2 is a functional block diagram of a second network connected device configured to provide an iOAM proxy, according to an example embodiment.

With reference now made to FIG. 2, depicted therein are a series of operations performed to provide iOAM for container application 115b, a container application not configured to provide iOAM functionality on its own. Specifically, a packet 235 is received at network connected device 105 as it traverses a network service chain (i.e., a service function chain). The path of packet 235 through network connected device 235 is illustrated through path 240 and the packet itself is illustrated at three points in this path: 1) a first point 235a when the packet is received at network connected device 105, 2) a second point 235b after the packet is processed by container application 115b, and 3) a third point 235c after the packet is processed by iOAM proxy 130.

Packet 235 is received at network connected device 105 from a previous hop 237 in a network service chain. As illustrated in packet 235a, the packet includes an Internet Protocol (IP) header 240, a Network Service Header (NSH) 245, an iOAM data header 250, and a payload 255. As illustrated, packet 235a is configured with NSH overlay encapsulation for service functions, though other examples may utilize other forms of encapsulation, such as Internet Protocol version 6 Segment Routing (SRv6) encapsulation. As shown, packet 235 is received at network connected device 105 with iOAM data from previous hop 237 included in iOAM data header 250. Process 120 routes packet 235 to container application 115b based upon the content of IP header 240 and NSH 245. Container application 115b processes packet 235, but as illustrated in packet 235b, no iOAM data is inserted into iOAM data header 250 by container application 115b. This is because container application 115b is not configured to provide iOAM services to the packets it processes. After processing, packet 235 is received at process 120. Upon receipt, iOAM proxy 130 accesses flow table 160 and iOAM proxy database 162. Flow table 160 and iOAM database 162 store data that is utilized by iOAM proxy 130 to provide the iOAM functionality described herein.

Figure 3:
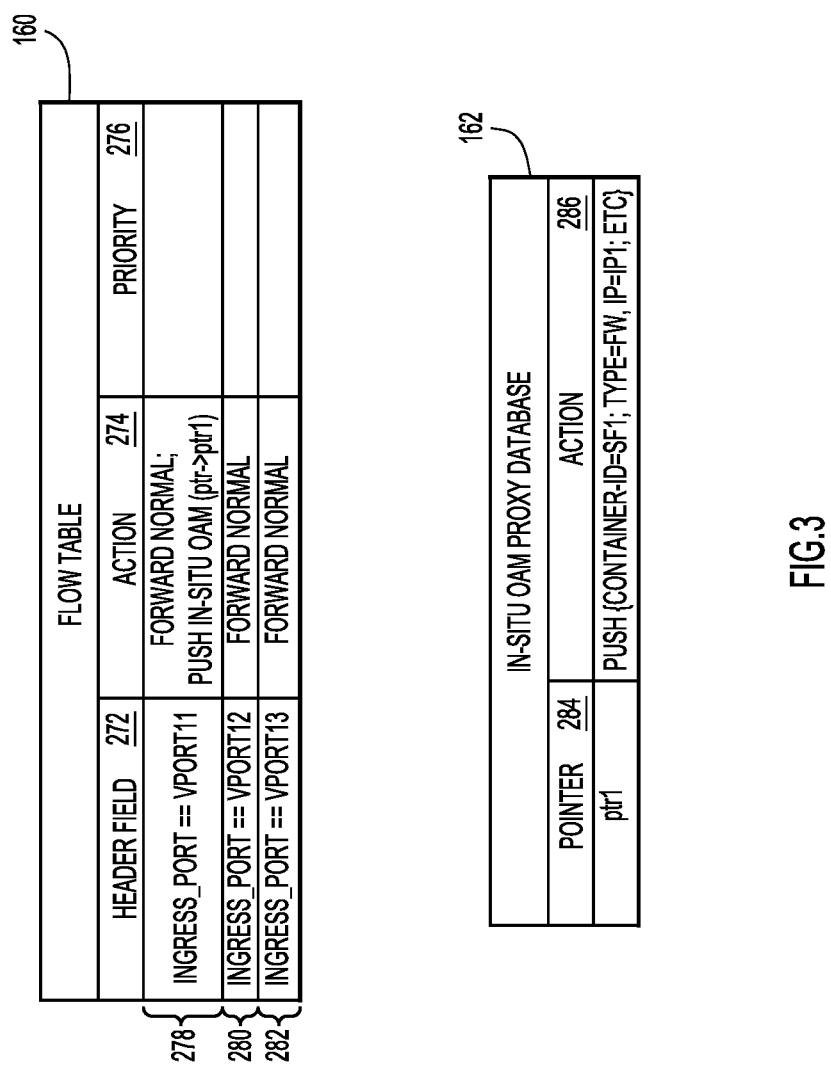
FIG. 3 is an illustration of first example data utilized by an iOAM proxy, according to an example embodiment.

Turning briefly to FIG. 3, depicted therein is an illustration of sample data contained in flow table 160 and iOAM database 162. Flow table 160 is utilized by process 120 of FIGS. 1 and 2 to provide individual networking functionality to container applications 115a-d. As illustrated, flow table 160 defines how packets are treated based on how they are received at process 120. For example, column 272 is used to identify packets to which the policy defined in the other columns of table 160 will be applied. According to the specific example embodiment of FIG. 3, column 272 identifies which of the virtual ports provided by process 120 over which a packet is received, though other example embodiments may using different matching criteria, such as a specific transport header, a MAC address, and others. Column 274 identifies the actions taken in response to receiving a packet as identified in column 272, and column 276 gives a priority to the action taken in column 274. Specifically, row 278 defines the actions taken when a packet is received over the virtual port associated with container application 115b of FIGS. 1 and 2, row 280 defines the actions taken when a packet is received over the virtual port associated with container application 115c of FIGS. 1 and 2, and row 282 defines the actions taken when a packet is received over the virtual port associated with container application 115d.

As shown in table 160, when a packet is received over the virtual port associated with container application 115b (i.e., when a packet is received that is associated with row 278), the packet is forwarded normally, and process 120 will "Push In-Situ OAM" data to the packet. A pointer "ptr1" in column 274 of row 278 indicates which iOAM data is to be pushed to the packet. This pointer "ptr1" points to particular data contained in iOAM proxy database 162.

iOAM proxy database 162 defines how the iOAM functionality provided by the iOAM proxy 130 is applied to packets. Specifically, iOAM proxy database 162 includes a pointer column 284 and an action column 286. Specifically, the data in column 286 indicates which iOAM data should be inserted into a packet that is received over a virtual port whose entry in flow table 160 includes pointer "ptr1" indicated in column 284. In this case, the iOAM data pushed to a packet received over the virtual port associated with container application 115b of FIGS. 1 and 2 includes the container identifier of container application 115b, the type of service function applied by container application 115b, the IP address for container application 115b, and other data.

It should be noted that flow table 160 and iOAM proxy database 162 are just one example of how the data used by iOAM proxy 130 of FIGS. 1 and 2 may be stored and implemented. For example, all of the data illustrated in FIG. 3 may be included in a single table or data store that combines the data of flow table 160 and iOAM proxy database 162. Other example embodiments may utilized an iOAM proxy database that is not linked to a flow table. For example, the iOAM database may include reference to the port over which packets are received, and therefore, may be accessed independently from the data stored in the flow table. So long as an association may be made between a received packet and a type of iOAM data to be provided to a received packet by an iOAM proxy process, the data falls within the concepts described herein.

Returning to FIG. 2, when packet 235 is received back at iOAM proxy 130 from container application 115b over virtual port 125b, iOAM proxy 130 accesses one or more of flow table 160 and/or iOAM proxy database 162 in order to determine whether or not iOAM data should be pushed to packet 235. Assuming data similar to that illustrated in FIG. 3, iOAM proxy 130 will push iOAM data to packet 235 by updating the iOAM header 250 to include at least the data illustrated in packet 235c. Specifically, iOAM proxy 130 inserts into the iOAM header 250 data indicating the container identifier of container application 115b, the type of service function applied by container application 115b, the IP address for container application 115b, and other data. Process 120 then forwards packet 235 along path 240 to the next service function in the service chain indicated in NSH header 245. While FIG. 2 illustrates the packet being sent back to service function 237, the packet may be forwarded to another service function external to network connected device 105, or another of container applications 115a-d, depending on the content of NSH 245.

Figure 4:
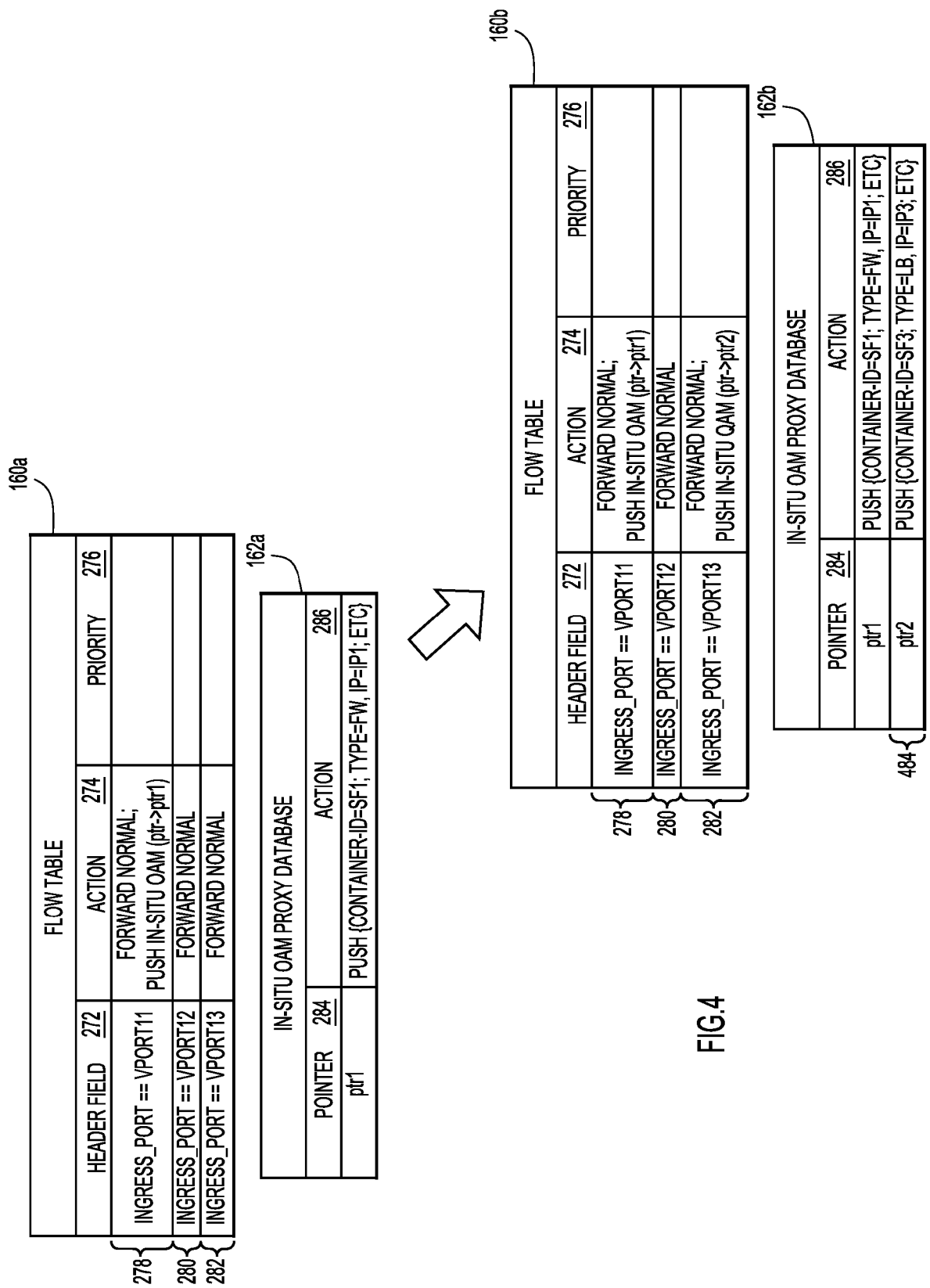
FIG. 4 is an illustration of second example data utilized by an iOAM proxy, according to an example embodiment.

With reference now made to FIG. 4, depicted therein is an example change to data stored at a network connected device, such as network connected device 105 of FIGS. 1 and 2, when a container application that is configured to provide iOAM offloads the insertion of iOAM into packets from the container application to an iOAM proxy, such as iOAM proxy 130 of FIGS. 1 and 2. Flow table 160*a* and iOAM proxy database 162*a* represent these data structures at some period of time prior to the offloading of iOAM functionality from a container application configured to provide iOAM to packets processed by the container application. Flow table 160*b* and iOAM proxy database 162*b* represent these data structures at a time after iOAM functionality is offloaded from the container application to the iOAM proxy.

As illustrated in FIG. 4, prior to the offloading of iOAM functionality from the container application to the iOAM proxy, flow table 160*a* indicates that the process providing individual network services to the container applications only provides iOAM functionality for packets received from the virtual port associated with row 278 of flow table 160*a*. Similarly, iOAM proxy database 162*a* contains an entry corresponding to the pointer "ptr1" indicated in column 274 of row 278 of flow table 160*a*. In other words, flow table 160*a* and iOAM proxy database 162*a* illustrate an environment like that of FIG. 1 in which iOAM proxy 130 only provides iOAM functionality to container applications that cannot provide such functionality on their own, such as container application 115*b*.

Returning briefly to FIG. 2, under the configuration illustrated in flow table 160*a* and iOAM proxy database 162*a*, a packet processed by container application 115*d* would receive iOAM data in its iOAM data header 250 from container application 115*d*, and process 120 would forward the processed packet along to the next of in the service chain indicated in the NSH of the packet.

Returning to FIG. 4, at some point a determination is made that the iOAM functionality previously supplied by the container application associated with the virtual port indicated in row 282 of flow table 160*a* should be offloaded to the iOAM proxy. In response to this determination, the updates to the data contained in flow table 160*a* are made as reflected in flow table 160*b*, and updates to the data in iOAM proxy database 162*a* are made as reflected in iOAM proxy database 162*b*. Specifically, column 282 of row 274 of flow table 160*b* indicates that the process providing individual network services to the container applications (e.g., process 120 of FIGS. 1 and 2) now provides iOAM functionality to the container application associated with row 282 of flow table 160*b* as illustrated through the new instructions contained in column 274 of row 282 of flow table 160*b*. Specifically, column 274 of row 282 of flow table 160*b* includes an instruction to "Push In-Situ OAM" and includes a pointer "ptr2." Pointer "ptr2" points to row 484 of iOAM proxy database 162*b*, in which column 286 indicates which type of iOAM is to be pushed to packets received over the virtual port indicated in row 282 of flow table 160*b*.

Figure 5:
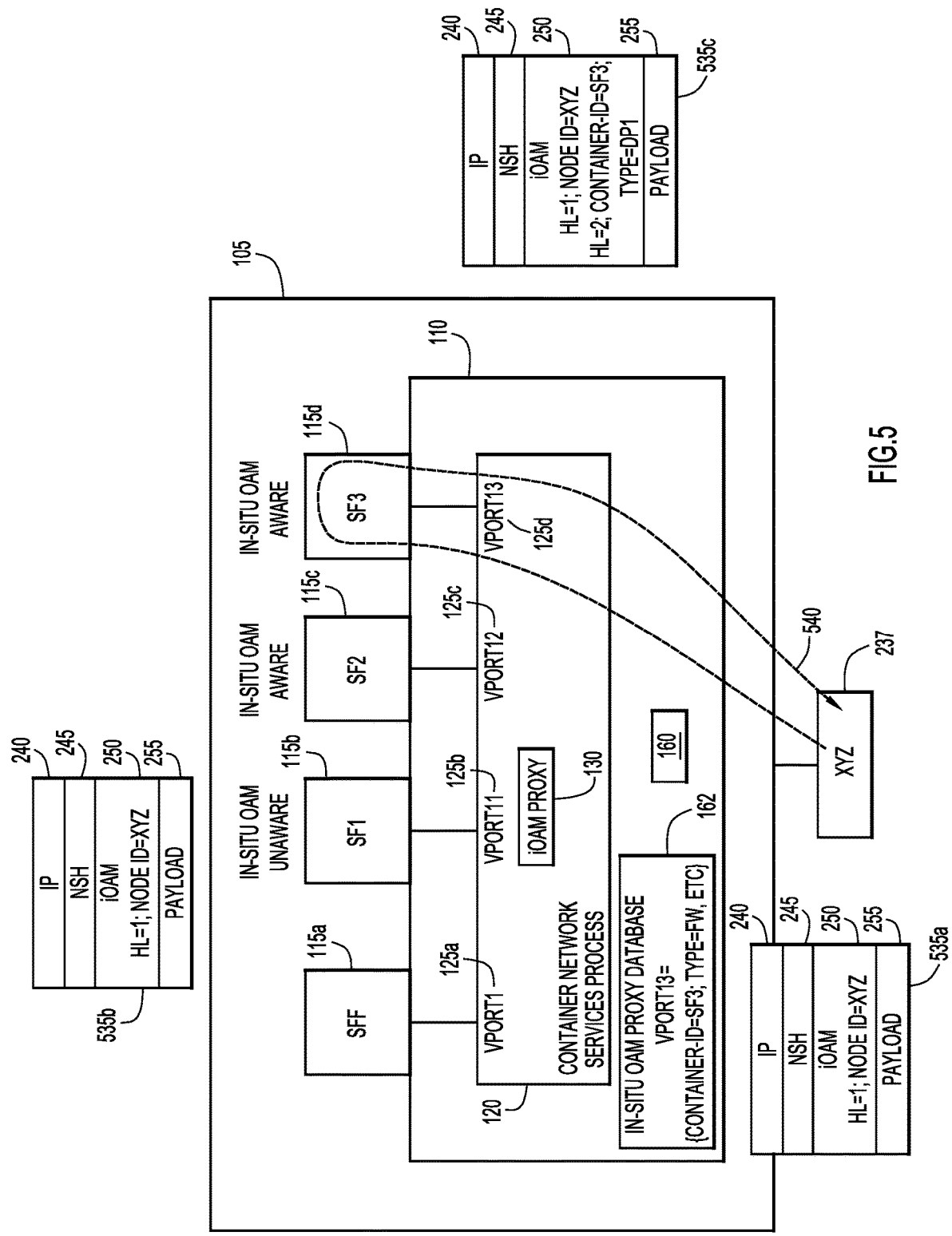
FIG. 5 is a functional block diagram of a third network connected device configured to provide an iOAM proxy, according to an example embodiment.

With reference now made to FIG. 5, depicted therein are a series of operations performed to provide iOAM for container application 115*d*, a container application that has offloaded iOAM functionality to iOAM proxy 130. Specifically, a packet 535 whose path is illustrated through path 540 and is illustrated at three points in this path: 1) a first point 535*a* when the packet is received at network connected device 105, 2) a second point 535*b* after the packet is processed by container application 115*d*, and 3) a third point 535*c* after the packet is processed by iOAM proxy 130. Essentially, the packet 535 undergoes the same operations that would take place had service function 115*d* been unable to provide iOAM functionality on its own. Accordingly, the operations of FIG. 5 are similar to those for FIG. 2.

For example, packet 535 is received at network connected device 105 from a previous hop 237 in a network service chain. Process 120 routes packet 535 to container application 115*d* based upon the content of IP header 240 and NSH 245. Container application 115*c* processes packet 535, but as illustrated in packet 535*b*, no iOAM data is inserted into iOAM data header 250 by container application 115*d*. This is because container application 115*d* has offloaded its iOAM functionality onto iOAM proxy 130. After processing by container application 115*d*, packet 535 is received at process 120. Upon receipt, iOAM proxy 130 accesses flow table 160 and iOAM proxy database 162. Flow table 160 and iOAM proxy database 162 have been updated as illustrated in FIG. 4, therefore, iOAM proxy 130 applies iOAM functionality and inserts iOAM data into the packet as illustrated in the data added to iOAM header 250 of packet 535*c*.

Figure 6:
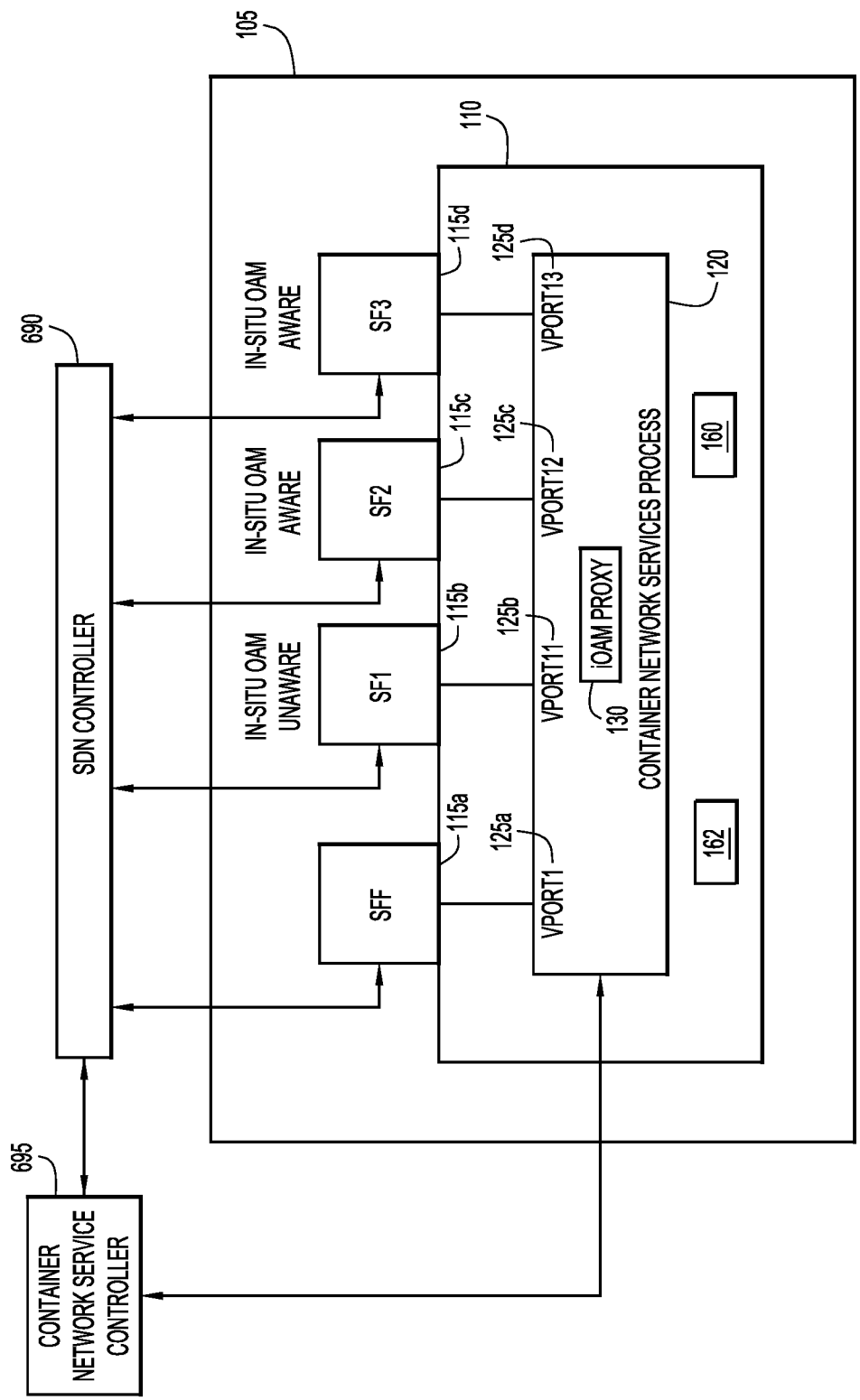
FIG. 6 is an illustration of network connected devices configured to off-load iOAM services from a container application to an iOAM proxy, according to an example embodiment.

The determination that iOAM functionality should be off-loaded from the container application to the iOAM proxy may take place in response to negotiations and communications between different entities, including different network connected devices and processes. Some of these entities are now described with reference to FIG. 6. Specifically, a network service chain that includes service functions applied by container applications 115*a-d* may be controlled and/or configured by a software defined network (SDN) controller 690. Similarly, process 120, which provides network services to container applications 115*a-d*, may be controlled by a centralized controller. According to one specific embodiment, when container network services process 120 may operate in conjunction with a container network services controller 695, such as Project Contiv's Contiv Master. Container network services master 695 may control and/or configure container network services process 120 (as well as container network services processes executing on other network connected devices). The determination to offload iOAM functionality from one of container applications 115*a-d* to iOAM proxy 130 may take place in a number of ways.

According to one example embodiment, one of container applications 115*a-d* may communicate directly with iOAM proxy 130 and/or container network services process 120. This communication may be implemented through technologies such as the Remote Procedure Call (RPC) protocol, Inter-Process Communication (IPC) protocol or the YANG data modeling language. These communications may indicate to iOAM proxy 130 that iOAM functionality will be offloaded to iOAM proxy 130, and may include the necessary data for iOAM proxy 130 and/or container network services process 120 to update flow table 160 and/or iOAM proxy database 162 as, for example, described above with reference to FIG. 4.

According to another example embodiment, one of container applications 115*a-d* will communicate with SDN controller 690, transmitting data indicating that iOAM functionality should be offloaded from the container application. SDN controller 690 will communicate this determination to container network services controller 695, and container network services controller 695 communicates this determination to iOAM proxy 130 and/or container network services process 120, including sufficient data for iOAM proxy 130 and/or container network services process 120 to update flow table 160 and/or iOAM proxy database 162 as, for example, described above with reference to FIG. 4. Similarly, the initial determination that iOAM functionality is to be offloaded to iOAM proxy 130 may initially come from SDN controller 690. SDN controller 690 will communicate the determination to the one of container applications 115*a-d* from which the iOAM functionality is being offloaded and container network services controller 695. Container network services controller 695 may then communicate the determination to iOAM proxy 130 and/or container network services process 120 with sufficient data for iOAM proxy 130 and/or container network services process 120 to update flow table 160 and/or iOAM proxy database 162 as, for example, described above with reference to FIG. 4.

In the examples above, the decision of whether or not an iOAM proxy should push iOAM data to a particular packet has been based on the virtual port from which the packet was received. If the packet was received from a virtual port associated with a container application that is not configured to provide iOAM data or from a port associated with a container application that has offloaded iOAM functionality to the iOAM proxy, then the iOAM proxy pushes iOAM data to the packet. As will be illustrated with reference to FIG. 7, additional considerations and/or conditions may be put on whether or not the iOAM proxy should push iOAM data to a particular packet. Illustrated in FIG. 7 is pseudocode 700. As shown through the pseudocode, the port over which packet is received, the destination address of the packet and the type of packet received are considered in determining whether or not iOAM data should be pushed for a packet. Specifically, if the packet is received over virtual port "vport13" and the destination address matches one of the addresses contained in "$ADDR" data structure, then iOAM data is pushed to the packet. iOAM data is also pushed to the packet if the packet is received over virtual port "vport13" and the packet contains a Segment Routing Header (SRH), the extension header for SRv6, which carries iOAM Type Length Value (TLV) data. If neither of these conditions are met, the packet is forwarded without receiving iOAM data, as illustrated in the "elseif" clause of pseudocode 700. According to other example embodiments, the iOAM data may be pushed to the packet based only upon the port over which the packet is received. Still other example embodiments may push iOAM data to packets based upon conditions evaluating one or more of the parameters described above, as well as other parameters that may include other Open System Interconnection (OSI) model conditions, including OSI model Layer 2, Layer 3 and/or Layer 4 details of a received packet.

Figure 8:
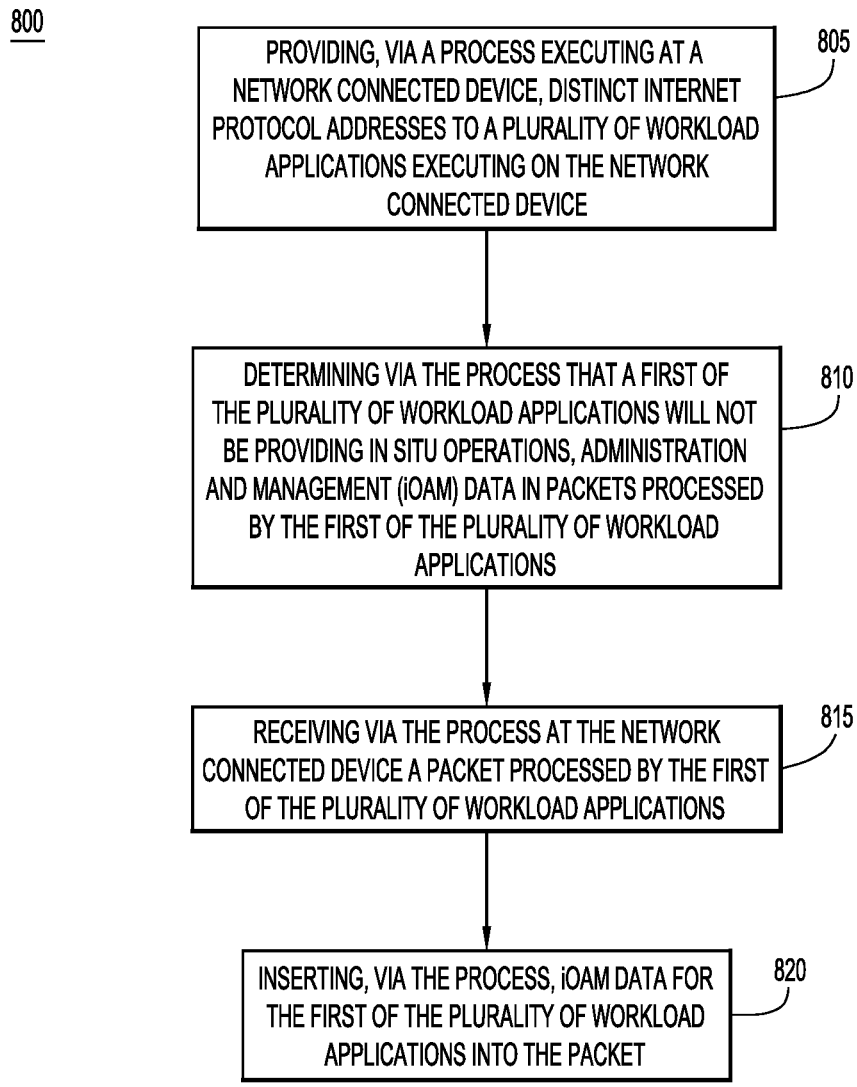
FIG. 8 is a flowchart illustrating a process for providing iOAM proxy services, according to an example embodiment.

With reference now made to FIG. 8, depicted therein is a flowchart 800 illustrating a process for providing iOAM functions for workload applications. The process begins in operation 805 in which a process executing on a network connected device provides policy-based forwarding rules that will be used to provide connectivity between workload applications and an external network work. For example, the process may provide distinct IP addresses to a plurality of container applications executing on the network connected device. For example, the process of operation 805 may be a process like process 120 of FIGS. 1, 2, 5 and 6 that provides individual network services to container applications executing on the network connected device. According to more specific example embodiments, the process of operation 805 may be a container network services process executing an iOAM proxy plugin within a container host application environment. According to other example embodiments, the plurality of workload applications may be embodied as a plurality of virtual machine applications and/or mircoservices applications.

In operation 810, the process determines that a first of the plurality of workload applications will not be providing iOAM data in packets processed by the first of the plurality of workload applications. This determination may be the initial configuration of a first of a plurality of container applications within a container host application environment during which it is determined that the first of the plurality of container applications is not configured to provide iOAM functionality. In such an example, the determination may be embodied as a communication from a container host application, a container network services process, a container network services controller, or an SDN controller to the iOAM proxy, or the determination may come from the iOAM proxy itself. According to other example embodiments, the determination may come in the form of a communication from a container application, a container network services controller or an SDN controller to the iOAM proxy that the first of the plurality of container applications is off-loading iOAM functionality from the first of the plurality of container applications to the iOAM proxy.

In operation 815, the network connected device receives a packet processed by the first of the plurality of workload applications. In operation 820, the process inserts iOAM data for the first of the plurality of workload applications into the packet. For example, iOAM data may be inserted into the packets received at an iOAM proxy as described above with reference to FIGS. 1, 2, and 5 above.

Figure 9:
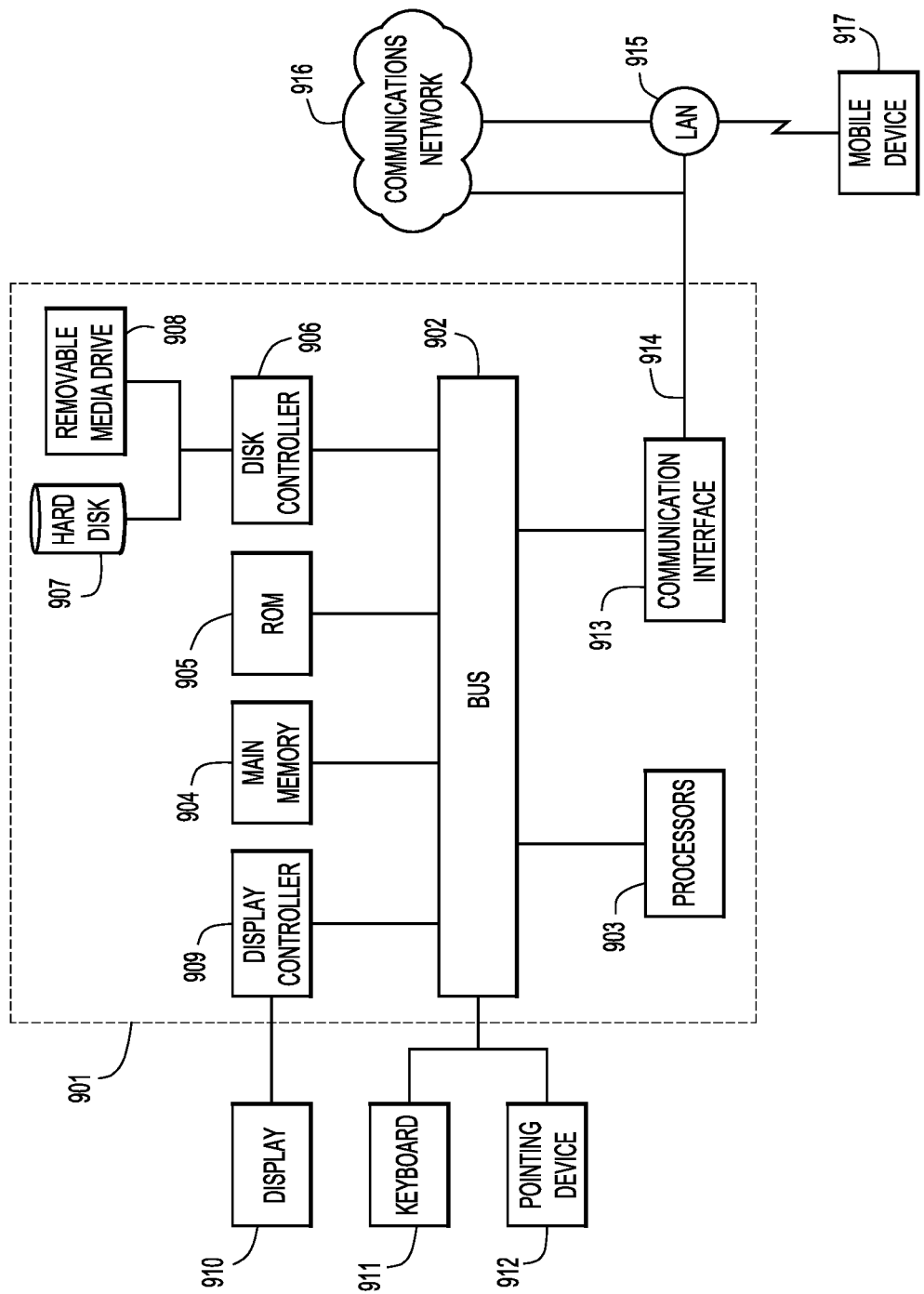
FIG. 9 is a block diagram of an apparatus configured according to the techniques described herein, according to an example embodiment.

FIG. 9 illustrates a computer system 901 upon which the embodiments presented may be implemented. The computer system 901 may be programmed to implement a computer based device, such as a network connected device, a container network services controller device, or an SDN controller as described above with reference to FIGS. 1-8. The computer system 901 includes a bus 902 or other communication mechanism for communicating information, and a processor 903 coupled with the bus 902 for processing the information. While the figure shows a single block 903 for a processor, it should be understood that the processors 903 represent a plurality of processing cores, each of which can perform separate processing. The computer system 901 also includes a main memory 904, such as a random access memory (RAM) or other dynamic storage device (e.g., dynamic RAM (DRAM), static RAM (SRAM), and synchronous DRAM (SD RAM)), coupled to the bus 902 for storing information and instructions to be executed by processor 903. In addition, the main memory 904 may be used for storing temporary variables or other intermediate information during the execution of instructions by the processor 903.

The computer system 901 further includes a read only memory (ROM) 905 or other static storage device (e.g., programmable ROM (PROM), erasable PROM (EPROM), and electrically erasable PROM (EEPROM)) coupled to the bus 902 for storing static information and instructions for the processor 903.

The computer system 901 also includes a disk controller 906 coupled to the bus 902 to control one or more storage devices for storing information and instructions, such as a magnetic hard disk 907, and a removable media drive 908 (e.g., floppy disk drive, read-only compact disc drive, read/write compact disc drive, compact disc jukebox, tape drive, and removable magneto-optical drive). The storage devices may be added to the computer system 901 using an appropriate device interface (e.g., small computer system interface (SCSI), integrated device electronics (IDE), enhanced-IDE (E-IDE), direct memory access (DMA), or ultra-DMA).

The computer system 901 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 901 may also include a display controller 909 coupled to the bus 902 to control a display 910, such as a cathode ray tube (CRT), Liquid Crystal Display (LCD) or other now known or hereinafter developed display technologies, for displaying information to a computer user. The computer system 901 may include input devices, such as a keyboard 911 and a pointing device 912, for interacting with a computer user and providing information to the processor 903. The pointing device 912, for example, may be a mouse, a trackball, or a pointing stick for communicating direction information and command selections to the processor 903 and for controlling cursor movement on the display 910. In addition, a printer may provide printed listings of data stored and/or generated by the computer system 901.

The computer system 901 performs a portion or all of the processing steps of the process in response to the processor 903 executing one or more sequences of one or more instructions contained in a memory, such as the main memory 904. Such instructions may be read into the main memory 904 from another computer readable medium, such as a hard disk 907 or a removable media drive 908. One or more processors in a multi-processing arrangement may also be employed to execute the sequences of instructions contained in main memory 904. In alternative embodiments, hard-wired circuitry may be used in place of or in combination with software instructions. Thus, embodiments are not limited to any specific combination of hardware circuitry and software.

As stated above, the computer system 901 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 901, for driving a device or devices for implementing the process, and for enabling the computer system 901 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 901 also includes a communication interface 913 coupled to the bus 902. The communication interface 913 provides a two-way data communication coupling to a network link 914 that is connected to, for example, a local area network (LAN) 915, or to another communications network 916 such as the Internet. For example, the communication interface 913 may be a wired or wireless network interface card to attach to any packet switched (wired or wireless) LAN. As another example, the communication interface 913 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 913 sends and receives electrical, electromagnetic or optical signals that carry digital data streams representing various types of information.

The network link 914 typically provides data communication through one or more networks to other data devices. For example, the network link 914 may provide a connection to another computer through a local area network 915 (e.g., a LAN) or through equipment operated by a service provider, which provides communication services through a communications network 916. The local network 914 and the communications network 916 use, for example, electrical, electromagnetic, or optical signals that carry digital data streams, and the associated physical layer (e.g., CAT 5 cable, coaxial cable, optical fiber, etc.). The signals through the various networks and the signals on the network link 914 and through the communication interface 913, which carry the digital data to and from the computer system 901 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 901 can transmit and receive data, including program code, through the network(s) 915 and 916, the network link 914 and the communication interface 913. Moreover, the network link 914 may provide a connection through a LAN 915 to a mobile device 917 such as a personal digital assistant (PDA) laptop computer, or cellular telephone.

In summary, provided for herein are iOAM proxies that allow processes, such as a container network services process, to selectively apply the iOAM proxy functionality per each workload application (e.g., per each hosted container's capability or preference at a given point of time). Such an iOAM proxy may eliminate the need for workload applications to understand or process iOAM in any Overlay header. Though described above with reference to network service chains (i.e., service function chains) and NSH headers, the techniques described herein are equally applicable to other overlays, including Internet Protocol version 6 (IPv6) and SRv6, among others. The techniques described herein may also be advantageous as they permit the iOAM proxy to be reused with various type of encapsulation, including Virtual Local Area Network encapsulation (VLAN), and Extensible VLAN (VXLAN) encapsulation, among others. Furthermore the techniques described herein provide robust scaling of SRv6 and NSH in container-based service chaining environments. Furthermore, while the example embodiments illustrated above implement the iOAM proxy in a container application environment, the techniques may also be applied with in other workload application environments, including virtual machine and microservices environments.

Example embodiments of the techniques described herein may provide one or more of the following novel benefits: 1) container network services processes able to identify container applications that do not support iOAM function and keep track of them utilizing a new flow table concept, 2) container network services processes configured to enforce the iOAM functions on behalf of iOAM-unaware containers, and 3) container network services processes configured to enforce the iOAM functions on behalf of iOAM-aware containers when the containers offload the iOAM processing to the container network services process.

Accordingly, in one form, the techniques described here are provided as a method comprising: providing, via a process executing at a network connected device, distinct Internet Protocol addresses to a plurality of workload applications executing on the network connected device; determining via the process that a first of the plurality of workload applications will not be providing iOAM data in packets processed by the first of the plurality of workload applications; receiving via the process at the network connected device a packet processed by the first of the plurality of workload applications; and inserting, via the process, iOAM data for the first of the plurality of workload applications into the packet.

In another form, an apparatus is provided comprising: one or more processors, wherein the one or more processors are configured to: provide, via a process executing via the one or more processors, distinct Internet Protocol addresses to a plurality of workload applications executing on the processor; determine via the process that a first of the plurality of workload applications will not be providing iOAM data in packets processed by the first of the plurality of workload applications; receive via the process at the one or more processors a packet processed by the first of the plurality of workload applications; and insert, via the process, iOAM data for the first of the plurality of workload applications into the packet.

In still another form, a tangible, non-transitory computer readable storage medium encoded with instructions is provided. The instructions, when executed, are operable to: provide, via a process executing at a network connected device, distinct Internet Protocol addresses to a plurality of workload applications executing on the network connected device; determine via the process that a first of the plurality of workload applications will not be providing iOAM data in packets processed by the first of the plurality of workload applications; receive via the process at the network connected device a packet processed by the first of the plurality of workload applications; and insert, via the process, iOAM data for the first of the plurality of workload applications into the packet.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   providing, via a process executing at a network connected device, distinct Internet Protocol addresses to a plurality of workload applications executing on the network connected device;
   determining via the process that a first of the plurality of workload applications will not be providing in-situ Operations, Administration and Management (iOAM) data in packets processed by the first of the plurality of workload applications;
   receiving, via the process at the network connected device, a packet processed by the first of the plurality of workload applications; and
   inserting, via the process, iOAM data for the first of the plurality of workload applications into the packet.

2. The method of claim 1, wherein determining via the process that the first of the plurality of workload applications will not be providing iOAM data in packets processed by the first of the plurality of workload applications comprises determining that the first of the plurality of workload applications is not configured to insert iOAM data into packets processed by the first of the plurality of workload applications.

3. The method of claim 1, wherein determining via the process that the first of the plurality of workload applications will not be providing iOAM data in packets processed by the first of the plurality of workload applications comprises determining that the first of the plurality of workload applications is offloading the insertion of iOAM data to packets processed by the first of the plurality of workload applications from the first of the plurality of workload applications to the process.

4. The method of claim 1, wherein the first of the plurality of workload applications comprises a workload application providing a service function within a service function chain.

5. The method of claim 1, further comprising:
   storing, in response to the determining, data indicating that the first of the plurality of workload applications will not be providing iOAM data in packets processed by the first of the plurality of workload applications; and
   accessing the data in response to the receiving the packet processed by the first of the plurality of workload applications.

6. The method of claim 5, wherein storing the data comprises storing data indicating a virtual port associated with the first of the plurality of workload applications; and
   wherein accessing the data comprises searching the data for the data indicating the virtual port when a packet is received over the virtual port.

7. The method of claim 5, further comprising:
   receiving, via the process at the network connected device, a message indicating that a second of the plurality of workload applications is offloading from the second of the plurality of workload applications to the process, insertion of iOAM data to packets processed by the second of the plurality of workload applications; and
   storing data indicating that the second of the plurality of workload applications will not be providing iOAM data in packets processed by the second of the plurality of workload applications.

8. The method of claim 1, wherein the process comprises a container host application and the plurality of workload applications comprises a plurality of container applications.

9. An apparatus comprising:
one or more processors, wherein the one or more processors are configured to:
provide, via a process executing via the one or more processors, distinct Internet Protocol addresses to a plurality of workload applications executing on the one or more processors;
determine via the process that a first of the plurality of workload applications will not be providing in-situ Operations, Administration and Management (iOAM) data in packets processed by the first of the plurality of workload applications;
receive via the process at the one or more processors a packet processed by the first of the plurality of workload applications; and
insert, via the process, iOAM data for the first of the plurality of workload applications into the packet.

10. The apparatus of claim 9, wherein the one or more processors are configured to determine via the process that the first of the plurality of workload applications will not be providing iOAM data in packets processed by the first of the plurality of workload applications by determining that the first of the plurality of workload applications is not configured to insert iOAM data into packets processed by the first of the plurality of workload applications.

11. The apparatus of claim 9, wherein the one or more processors are configured to determine via the process that the first of the plurality of workload applications will not be providing iOAM data in packets processed by the first of the plurality of workload applications by determining that the first of the plurality of workload applications is offloading the insertion of iOAM data to packets processed by the first of the plurality of workload applications from the first of the plurality of workload applications to the process.

12. The apparatus of claim 9, wherein the first of the plurality of workload applications comprises a workload application providing a service function within a service function chain.

13. The apparatus of claim 9, further comprising a memory, wherein the one or more processors are further configured to:
store in the memory, in response to the determining, data indicating that the first of the plurality of workload applications will not be providing iOAM data in packets processed by the first of the plurality of workload applications; and
access the data in the memory in response to the receiving the packet processed by the first of the plurality of workload applications.

14. The apparatus of claim 9, wherein the process comprises a container host application, and the plurality of workload applications comprises a plurality of container applications.

15. A non-transitory computer readable storage medium encoded with instructions, wherein the instructions, when executed, are operable to:
provide, via a process executing at a network connected device, distinct Internet Protocol addresses to a plurality of workload applications executing on the network connected device;
determine via the process that a first of the plurality of workload applications will not be providing in-situ Operations, Administration and Management (iOAM) data in packets processed by the first of the plurality of workload applications;
receive via the process at the network connected device a packet processed by the first of the plurality of workload applications; and
insert, via the process, iOAM data for the first of the plurality of workload applications into the packet.

16. The non-transitory computer readable storage medium of claim 15, wherein the instructions operable to determine via the process that the first of the plurality of workload applications will not be providing iOAM data in packets processed by the first of the plurality of workload applications are operable to determine that the first of the plurality of workload applications is not configured to insert iOAM data into packets processed by the first of the plurality of workload applications.

17. The non-transitory computer readable storage medium of claim 15, wherein the instructions operable to determine via the process that the first of the plurality of workload applications will not be providing iOAM data in packets processed by the first of the plurality of workload applications are operable to determine that the first of the plurality of workload applications is offloading the insertion of iOAM data to packets processed by the first of the plurality of workload applications from the first of the plurality of workload applications to the process.

18. The non-transitory computer readable storage medium of claim 15, wherein the first of the plurality of workload applications comprises a workload application providing a service function within a service function chain.

19. The non-transitory computer readable storage medium of claim 15, further comprising instructions operable to:
store, in response to the determining, data indicating that the first of the plurality of workload applications will not be providing iOAM data in packets processed by the first of the plurality of workload applications; and
access the data in response to the receiving the packet processed by the first of the plurality of workload applications.

20. The non-transitory computer readable storage medium of claim 15, wherein the process comprises a container host application, and the plurality of workload applications comprises a plurality of container applications.

* * * * *